(12) United States Patent
Hayashibara

(10) Patent No.: US 7,394,972 B2
(45) Date of Patent: Jul. 1, 2008

(54) OPTICAL DISC REPRODUCTION APPARATUS

(75) Inventor: Kazuki Hayashibara, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 374 days.

(21) Appl. No.: 11/330,342

(22) Filed: Jan. 12, 2006

(65) Prior Publication Data
US 2006/0159434 A1    Jul. 20, 2006

(30) Foreign Application Priority Data
Jan. 14, 2005    (JP)    ............................ 2005-007441

(51) Int. Cl.
*H04N 5/91*    (2006.01)
(52) U.S. Cl. ............................. 386/96; 386/97; 386/98; 386/104; 386/105; 386/106; 386/126
(58) Field of Classification Search .................. 386/96, 386/97, 98, 104, 105, 106
See application file for complete search history.

(56) References Cited

U.S. PATENT DOCUMENTS

| 6,396,998 | B1 * | 5/2002 | Nozaki et al. ................. 386/52 |
| 7,263,275 | B2 * | 8/2007 | Demas et al. ................. 386/68 |
| 2004/0120345 | A1 * | 6/2004 | Yamaguchi et al. .......... 370/465 |
| 2004/0146286 | A1 * | 7/2004 | Hayashibara et al. ......... 386/98 |
| 2007/0160350 | A1 * | 7/2007 | Ikeda et al. ................... 386/99 |
| 2007/0168601 | A1 * | 7/2007 | Plourde, Jr. .................. 711/112 |

FOREIGN PATENT DOCUMENTS

| JP | 2000-222826 | 8/2000 |
| JP | 2002-170330 | 6/2002 |
| JP | 2002-251827 | 9/2002 |
| JP | 2004-220693 | 8/2004 |

* cited by examiner

*Primary Examiner*—Thai Tran
*Assistant Examiner*—Helen Shibru
(74) *Attorney, Agent, or Firm*—Morgan, Lewis & Bockius LLP

(57) ABSTRACT

An optical disc reproduction apparatus starts reproduction of audio other than DTS audio when the audio number of the DTS audio on an optical disc is found to be greater than the audio number of other audio, starts reproduction of DTS audio assigned an audio number "1" when the audio number of the DTS audio is found to be smaller than the audio number of other audio and in addition DTS digital output is found to be set for bit-stream output, and starts reproduction of the audio, other than the DTS audio, assigned the smallest audio number among audio numbers "2" and greater when DTS digital output is found to be turned off. Thus, though furnished with no capability of outputting DTS audio on an analog basis, the optical disc reproduction apparatus can prevent audio output from remaining silent even when DTS audio assigned an audio number "1" is automatically selected.

5 Claims, 4 Drawing Sheets

201 ; AUDIO NUMBER CHECKING MEANS
202 ; FIRST REPRODUCTION STARTING MEANS
203 ; OUTPUT SETTING CHECKING MEANS
204 ; SECOND REPRODUCTION STARTING MEANS
205 ; THIRD REPRODUCTION STARTING MEANS

| AUDIO COMPRESSED DATA TYPE | AUDIO IDENTIFICATION INFORMATION ||
|---|---|---|
| | STREAM ID | UPPER 5 BITS OF SUBSTREAM ID |
| LPCM | 10111101 | 10100 |
| DOLBY DIGITAL | 10111101 | 10000 |
| MPEG AUDIO | 11000*** OR 11010*** | NOT AVAILABLE |
| DTS | 10111101 | 10001 |

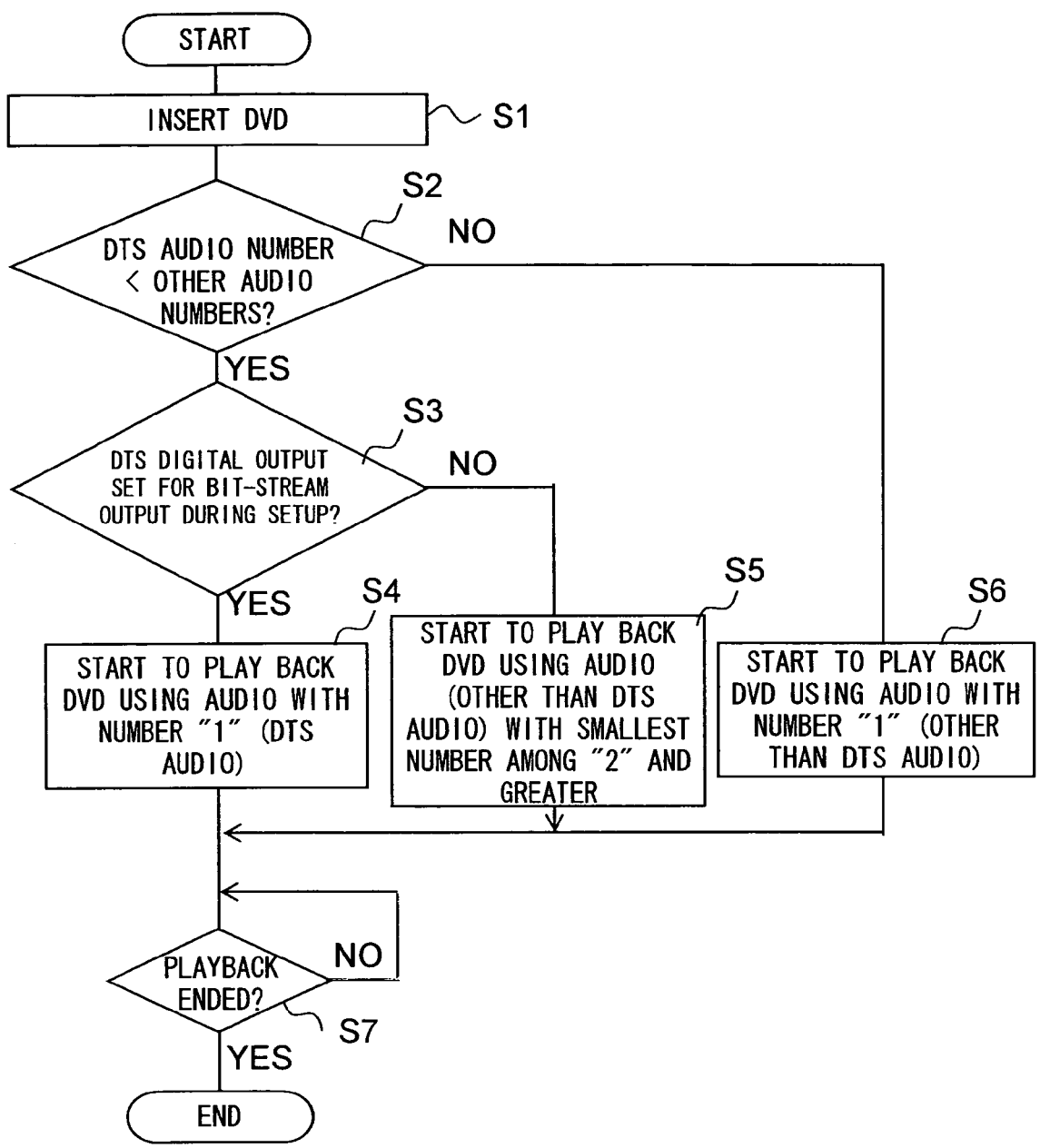

OPTICAL DISC REPRODUCTION APPARATUS

This application is based on Japanese Patent Application No. 2005-007441 filed on Jan. 14, 2005, the contents of which are hereby incorporated by reference.

BACKGROUND OF THE INVENTION

1. Field of the Invention

The present invention relates to an optical disc reproduction apparatus for reading video, audio, and other information recorded on an optical disc such as a DVD (digital versatile disc) for the purpose of reproducing audio and video. More particularly, the present invention relates to an optical disc reproduction apparatus furnished with no capability of outputting DTS (digital theater system) audio on an analog basis but a capability of outputting it on a digital basis.

2. Description of Related Art

Among optical discs such as DVDs, those having recorded thereon various types of compressed audio data compatible with LPCM (linear pulse code modulation), Dolby digital, MPEG (Moving Picture Coding Experts Group) audio, DTS, etc. have conventionally been known as multiple audio stream optical discs. The current trend with such optical discs is that an increasing number of them have DTS audio recorded as the first stream.

On the other hand, among optical disc reproduction apparatus for reproducing audio and other information recorded on optical discs, some are not equipped with a decoder (a DTS recorder) for analog reproduction of DTS audio within an audio decoder for reproducing audio and are thus furnished with no capability of outputting DTS audio on an analog basis but a capability of outputting it on a digital basis (as a bit stream), and some are so configured as not to output DTS audio because no license fees have been paid for patents related to a DTS decoder.

Incidentally, in an optical disc reproduction apparatus furnished with no capability of outputting DTS audio on an analog basis but a capability of outputting it on a digital basis as described above, if the first stream of audio (the audio assigned an audio number "1") recorded on an optical disc is DTS audio, the DTS audio is reproduced unconditionally. However, since the optical disc reproduction apparatus is furnished with no capability of outputting DTS audio on an analog basis, it cannot output audio, and thus remains silent. Seeing that the optical disc reproduction apparatus remains silent, the user may come to mistakenly believe that it has broken down.

According to the prior-art technique disclosed in Japanese Patent Application Laid-open No. 2004-220693, in an optical disc reproduction apparatus equipped with no DTS decoder, when DTS audio is recorded on an optical disc, the DTS audio is forcibly excluded from selection during reproduction. This, however, makes it impossible, when the user wants the DTS audio outputted during initial setting (setup), to output the audio even on a digital basis (as a bit stream).

According to the prior-art technique disclosed in Japanese Patent Application Laid-open No. 2002-170330, a muting circuit is activated at the start of reproduction. If a bit pattern checker detects a DTS synch signal and a DTS header signal in a bit stream within a predetermined period, the reproduction mode of signal processing is changed to a DTS mode, and the muting by the muting circuit is cancelled. If the bit pattern checker does not detect a DTS synch signal and a DTS header signal in the bit stream within the predetermined period, the reproduction mode of signal processing is changed to a PCM mode, and the muting by the muting circuit is cancelled.

This prior-art technique, however, is not meant to prevent an optical disc reproduction apparatus from remaining silent in a case where it is furnished with no capability of outputting DTS audio on an analog basis but a capability of outputting it on a digital basis and it is so configured as to output DTS audio unconditionally when the first stream of audio (the audio assigned an audio number "1") recorded on an optical disc is DTS audio.

According to the prior-art technique disclosed in Japanese Patent Application Laid-open No. 2002-251827, before the start of reproduction of a data stream recorded on a disc, silent digital audio in the same format as the digital audio that is about to be outputted is recorded in a memory in advance, and the silent digital audio is outputted to prompt quick decoding of the digital stream.

This prior-art technique, however, is also not meant to prevent an optical disc reproduction apparatus from remaining silent in a case where it is furnished with no capability of outputting DTS audio on an analog basis but a capability of outputting it on a digital basis and it is so configured as to output DTS audio unconditionally when the first stream of audio (the audio assigned an audio number "1") recorded on an optical disc is DTS audio.

The prior-art technique disclosed in Japanese Patent Application Laid-open No. 2000-222826 relates to a D/A conversion device that converts a compressed digital audio signal and a non-compressed digital audio signal into an analog audio signal, and more particularly to a muting device that brings a signal amplifying circuit for amplifying an analog audio signal into a muting state when audio is silent during reproduction of both a compressed digital audio signal and a non-compressed digital audio signal. Thus, this prior-art technique does not relate to an optical disc reproduction apparatus furnished with no capability of outputting DTS audio on an analog basis but a capability of outputting it on a digital basis.

SUMMARY OF THE INVENTION

In view of the conventionally encountered inconveniences discussed above, it is an object of the present invention to provide an optical disc reproduction apparatus furnished with no capability of outputting DTS audio on an analog basis but a capability of outputting it on a digital basis wherein audio output is prevented from remaining silent even when an optical disc having DTS audio recorded with an audio number "1" is reproduced and the DTS audio is automatically selected, or even when DTS digital output is turned off.

To achieve the above object, according to the present invention, an optical disc reproduction apparatus starts reproduction of audio other than DTS audio when the audio number of the DTS audio on an optical disc is found to be greater than the audio number of other audio, starts reproduction of DTS audio assigned an audio number "1" when the audio number of the DTS audio is found to be smaller than the audio number of other audio and in addition DTS digital output is found to be set for bit-stream output, and starts reproduction of the audio, other than the DTS audio, assigned the smallest audio number among audio numbers "2" and greater when DTS digital output is found to be turned off. Thus, though furnished with no capability of outputting DTS audio on an analog basis, the optical disc reproduction apparatus can prevent audio output from remaining silent even when DTS audio assigned an audio number "1" is automatically selected.

BRIEF DESCRIPTION OF THE DRAWINGS

FIG. 5 is a flow chart illustrating the procedure performed by the optical disc reproduction apparatus embodying the present invention to select and reproduce audio recorded on a DVD.

DETAILED DESCRIPTION OF PREFERRED EMBODIMENTS

Figure 1:
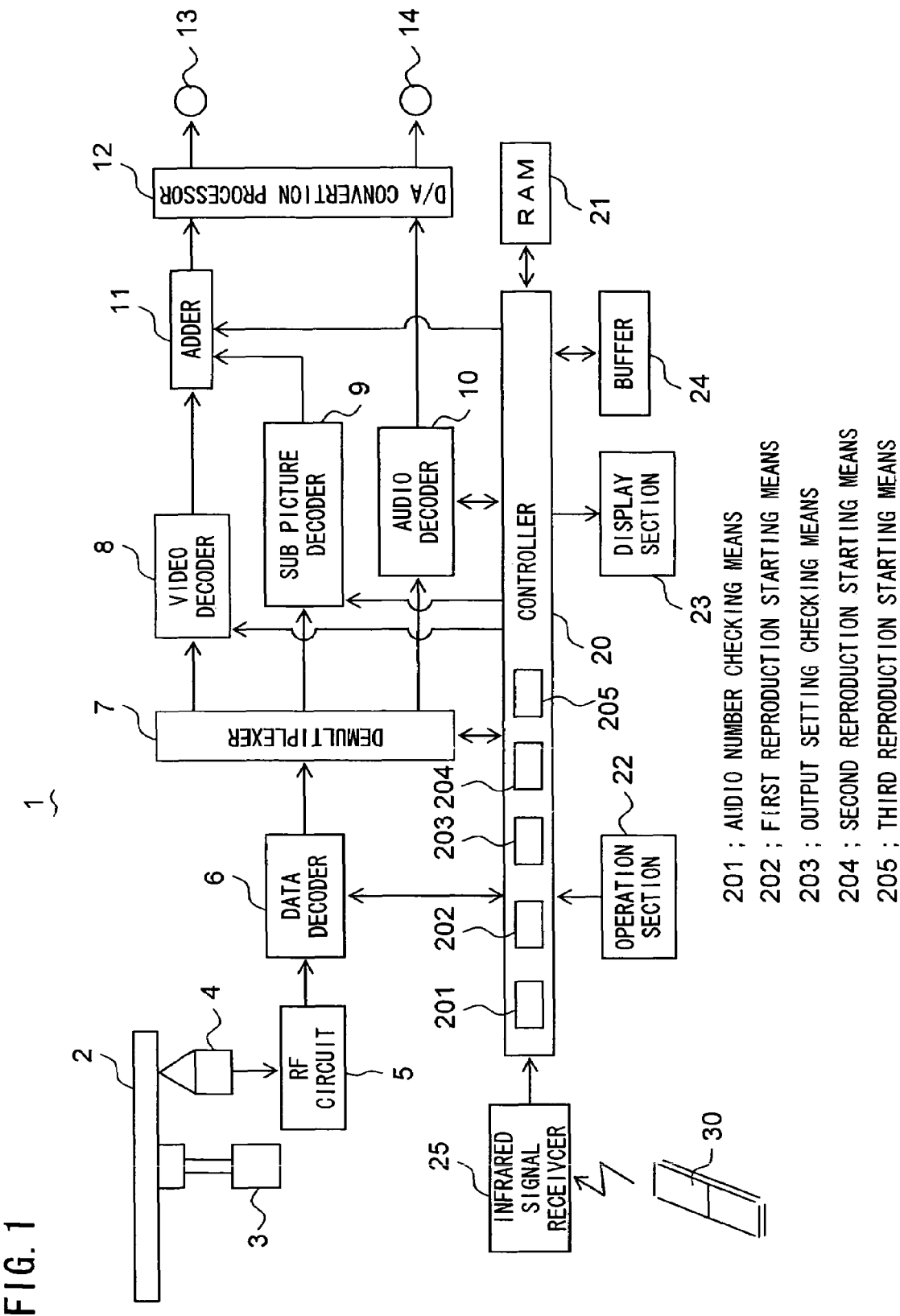
FIG. 1 is a block diagram showing the configuration of an optical disc reproduction apparatus as one embodiment of the present invention.

Hereinafter, with reference to the accompanying drawings, an embodiment of the present invention will be described. FIG. 1 is a block diagram showing the construction of an optical disc reproduction apparatus as one embodiment of the present invention. The optical disc reproduction apparatus 1 is an apparatus that reads compressed data of video, audio, and the like recorded on a DVD 2 as an optical disc, then reproduces the video, audio, and the like, and then outputs the reproduced video, audio, and the like. Here, the optical disc reproduction apparatus 1 is of a type furnished with no capability of outputting DTS audio on an analog basis but a capability of outputting DTS audio on a digital basis.

The optical disc reproduction apparatus 1 includes: a spindle motor 3 that drives to rotate a DVD 2 placed on a tray; an optical pickup 4 that outputs the information recorded on the DVD 2 in the form of an RF signal; an RF circuit 5 that performs binarization and other processing on the RF signal outputted from the optical pickup 4; and a data decoder 6 that performs decoding processing such as data decoding and error correction on the data obtained through the processing performed by the RF circuit 5. The optical disc reproduction apparatus 1 further includes: a demultiplexer 7 that sorts the data obtained through the decoding processing performed by the data decoder 6 into main video compressed data, sub video compressed data, and various types of audio compressed data; a video decoder 8 that decodes the main video compressed data; a sub picture decoder 9 that decodes the sub video compressed data to reproduce caption data; and an audio decoder 10 that decodes the various types of audio compressed data.

An adder 11 integrates together the main video data from the video decoder 8 and the sub video data, such as captions, from the sub picture decoder 9. A D/A conversion processor 12 converts the image data obtained through the integration performed by the adder 11 and the audio data obtained through the decoding performed by the audio decoder 10 into analog signals. Via a video output terminal 13 and an audio output terminal 14, the image signal and audio signal from the D/A conversion processor 12 are outputted.

The optical disc reproduction apparatus 1 further includes: a controller 20 that controls the apparatus as a whole; and a remote control 30 via which the user sends commands such as "play back" and "stop" to and make various settings on the apparatus itself. Connected to the controller 20 are the spindle motor 3, the RF circuit 5, the data decoder 6, the demultiplexer 7, the video decoder 8, the sub picture decoder 9, the audio decoder 10, and the adder 11. Also connected to the controller 20 are: a RAM 21 that stores various setting data and the like; an operation section 22 from which the user feeds various commands to the apparatus; a display section 23 that displays various messages; a buffer 24 that temporarily stores data such as resume information; and an infrared signal receiver 25.

Figures 2, 3:
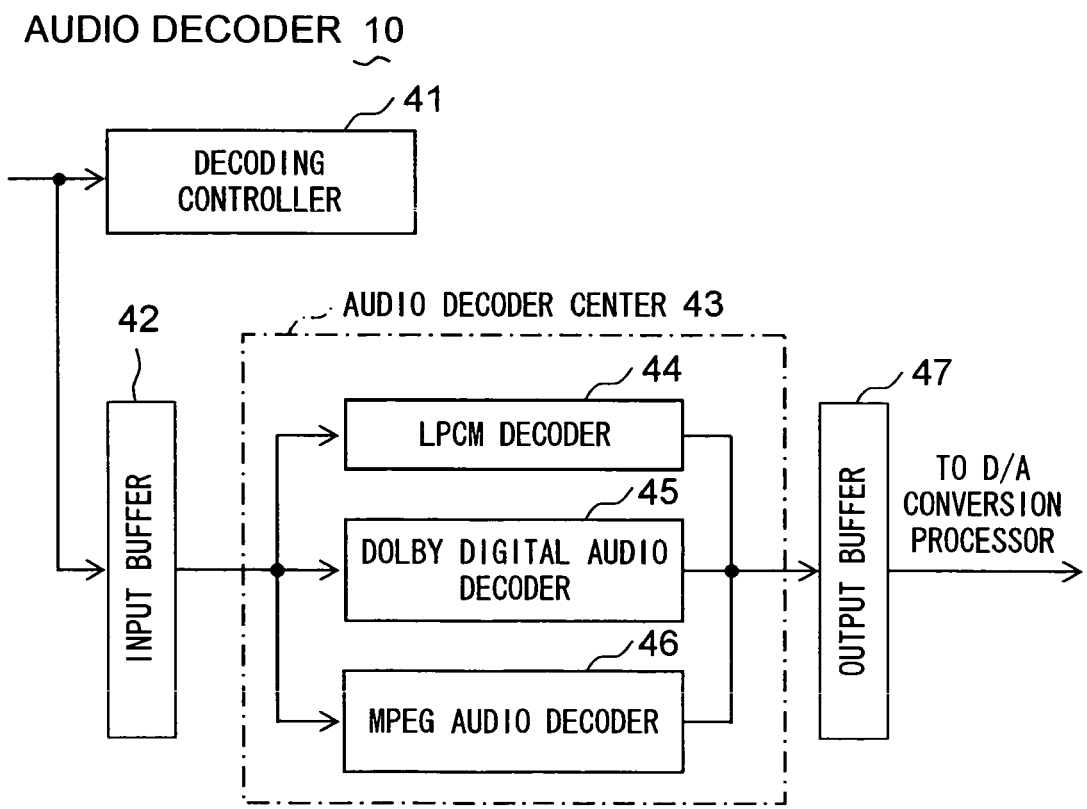
FIG. 2 is a table showing the contents of the identification information stored in a RAM provided in the optical disc reproduction apparatus embodying the present invention for identifying different types of compressed audio data.
FIG. 3 is a block diagram showing the configuration of a principal portion of the audio decoder provided in the optical disc reproduction apparatus embodying the present invention.

In the RAM 21 is stored a table containing identification information for identifying main video compressed data, sub video compressed data, and various types of audio data. Of all the identification information, that which identifies each type of audio compressed data consists of, as shown in FIG. 2, a stream ID and the upper five bits of a substream ID. The table contains the identification information that identifies different types of audio compressed data, namely that compatible with LPCM, Dolby digital, MPEG audio, and DTS.

When the user feeds a "play back" command to the controller 20, the controller 20 reads from the RAM 21 the identification information stored in the table and feeds it to the demultiplexer 7, and also feeds the identification information that identifies a particular type of audio compressed data selected based on predetermined conditions to the demultiplexer 7. Based on the thus fed identification information, the demultiplexer 7 sorts the compressed data from the data decoder 6 into main video compressed data, sub video compressed data, and audio compressed data, and moreover extracts, from the audio compressed data, that containing the identification information that identifies the particular type of audio compressed. Of the compressed data thus sorted out, the main video compressed data is fed to the video decoder 8, the sub video compressed data is fed to the sub picture decoder 9, and the extracted audio compressed data is fed to the audio decoder 10.

The controller 20 includes: audio number checking means 201 that checks whether the audio number of the DTS audio on the DVD 2 is greater than or smaller than the audio number of other audio; first reproduction starting means 202 that, if the audio number checking means 201 finds the audio number of the DTS audio to be greater than the audio number of other audio, starts reproduction of the audio other than the DTS audio; output setting checking means 203 that, if the audio number checking means 201 finds the audio number of the DTS audio to be smaller than the audio number of other audio, checks whether, during setup, DTS digital output is set for digital output in the form of a bit stream or turned off; second reproduction starting means 204 that, if the output setting checking means 203 finds the DTA digital output to be set for digital output in the form of a bit stream, starts reproduction of DTS audio assigned an audio number "1"; and third reproduction starting means 205 that, if the output setting checking means 203 finds the DTA digital output to be turned off, starts reproduction of the audio, other than the DTS audio, assigned the smallest number among audio numbers "2" and greater.

FIG. 3 is a block diagram showing the configuration of a principal portion of the audio decoder 10 shown in FIG. 1. The audio decoder 10 includes: a decoding controller 41 that controls the operation of the audio decoder 10 as a whole by using additional data contained in the audio compressed data from the demultiplexer 7 (see FIG. 1); an input buffer 42 that temporarily stores the audio compressed data from the demultiplexer 7; an audio decoder center 43 that reproduce audio data based on the audio compressed data from the input buffer 42; and an output buffer 47 that temporarily stores the audio data, in digital form, to be outputted to the D/A conversion processor 12.

The audio decoder center 43 includes a decoder for LPM audio (LPCM decoder) 44, a decoder for Dolby digital audio (Dolby digital audio decoder) 45, and a decoder for MPEG audio (MPEG audio decoder) 46. By referring to the stream ID (see what is indicated as 56 in FIG. 6) and the upper five bits of the substream ID (see what is indicated as 53 in FIG. 6), both contained in the audio compressed data from the demultiplexer 7, the audio decoder center 43 identifies the type of the audio compressed data, and selects, according to the thus identified type of the compressed data, the audio decoder that it uses. Then, by using the selected audio decoder, the audio decoder center 43 decompresses and decodes the audio compressed data fed from the input buffer 42.

Figure 4:
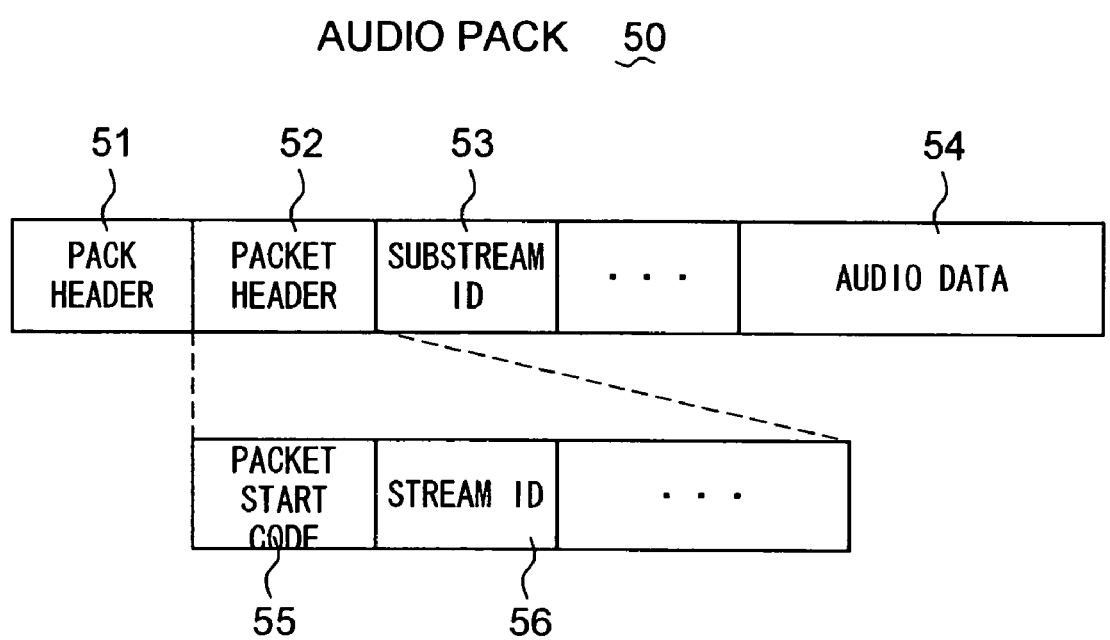
FIG. 4 is a diagram showing how an audio pack is recorded on a DVD that is read by the optical disc reproduction apparatus embodying the present invention.

Next, the stream ID and substream ID in the above-mentioned audio compressed data will be described with reference to FIG. 4. FIG. 4 shows how an audio pack is recorded on the DVD 2. The audio compressed data fed from the data decoder 6 to the demultiplexer 7 is composed of a plurality of such audio packs 50 linked together, or is composed of a single such audio pack 50. An audio pack 50 itself is composed of, among others, a pack header 51, a packet header 52, a substream ID 53, and audio data 54.

The pack header 51 includes, among others, a pack start code and a system clock reference value. The packet header 52 includes, among others, a packet start code 55 and a stream ID 56. The audio compressed data fed from the data decoder 6 to the demultiplexer 7 includes a stream ID 56 and a substream ID 53, and the demultiplexer 7, by referring to the stream ID 56 and the upper five bits of the substream ID 53, extracts a particular type of audio compressed data from among the audio compressed data fed thereto, and feeds the extracted audio compressed data to the audio decoder 10.

FIG. 5 is a flow chart illustrating the procedure performed in this embodiment to select and reproduce audio on a DVD. Now, with reference to this flow chart, how audio on a DVD is selected and reproduced will be described.

First, the user inserts a DVD 2 into the optical disc reproduction apparatus 1 (step S1). Then the user operates the remote control 30 to bring the optical disc reproduction apparatus 1 into a play back mode. This makes the DVD 2 rotate. Now, the audio number checking means 201 of the controller 20 reads the disc information of the DVD 2 via the optical pickup 4, the RF circuit 5, and the data decoder 6, and checks whether the audio number assigned to DTS audio is greater or smaller than the audio number assigned to other audio (step S2).

If the audio number checking means 201 finds the audio number assigned to the DTS audio to be greater than the audio number assigned to the other audio, the first reproduction starting means 202 starts to play back the DVD 2 by using the audio assigned an audio number "1" (audio other than the DTS audio) (step S6). If the audio number checking means 201 finds the audio number assigned to the DTS audio to be smaller than the audio number assigned to the other audio, the output setting checking means 203 of the controller 20 checks whether, during setup, DTS digital output is set for bit-stream output (digital output) or turned off (step S3).

If the output setting checking means 203 finds the DTS digital output to be set for bit-stream output, the second reproduction starting means 204 of the controller 20 controls the optical pickup 4 and the data decoder 6 to start to play back the DVD 2 by using the audio assigned an audio number "1" (DTS audio) (step S4). If the output setting checking means 203 finds the DTS digital output to be turned off, the third reproduction starting means 205 of the controller 20 controls the optical pickup 4 and the data decoder 6 to start to play back the DVD 2 by using the audio, other than DTS audio, assigned the smallest audio number among audio numbers "2" and greater (step S5).

For example, if the audio assigned the smallest audio number among audio numbers "2" and greater is Dolby digital audio, the Dolby digital audio is reproduced. Incidentally, for example, if Dolby digital audio is recorded before DTS audio, since the Dolby digital audio can be reproduced on an analog basis, it is reproduced and outputted as it is.

In this way, in step S4, S5, or S6, the DVD 2 starts to be played back. When the playback ends (step S7), the procedure is finished.

As described above, in this embodiment, if DTS digital output is turned off during setup, it is not outputted either on an analog or digital basis. Thus, by automatically selecting other audio, it is possible to prevent silent output. On the other hand, if DTS digital output is set for bit-stream output during setup, this means that the user wants to listen to DTS audio outputted on a digital basis. Thus, by selecting DTS audio as it is without lowering the priority for selecting DTS audio, it is possible to make the apparatus output audio, and thereby to prevent the user from mistakenly believing that the apparatus has broken down.

That is, according to the present invention, even when the audio assigned an audio number "1" is DTS audio, or even when DTS digital output is turned off, it is possible to prevent silent output and make the apparatus output audio so that the user does not mistakenly believe that the apparatus has broken down.

What is claimed is:

1. An optical disc reproduction apparatus comprising:
an optical pickup that reads compressed data of video and audio recorded on an optical disc;
storing means that stores a table containing identification information for identifying type of the compressed data read by the optical pickup;
a demultiplexer that sorts the compressed data read by the optical pickup according to the type of the compressed data based on the identification information stored in the storing means;
video reproducing means that reproduces video data based on the compressed data of video sorted out by the demultiplexer;
audio reproducing means that reproduces audio data based on the compressed data of audio sorted out by the demultiplexer; and
a controller that controls the optical pickup, the storing means, the video reproducing means, and the audio reproducing means,
wherein the identification information stored in the storing means contains audio identification information for identifying type of the audio data,
wherein the audio reproducing means
has various audio decoders for reproducing compressed data of various types of audio read by the optical pickup,
is configured to compare audio identification information contained in the compressed data of audio read by the optical pickup with the audio identification information stored in the table in order to identify type of the compressed data of audio read by the optical pickup and select, according to the identified type of the compressed data, a corresponding audio decoder from among the various audio decoders, and is furnished with no capability of outputting DTS audio on an analog basis but a capability of outputting DTS audio on a digital basis, wherein the controller includes:

audio number checking means that checks whether an audio number of DTS audio on an optical disc is greater or smaller than an audio number of other audio;

first reproduction starting means that, if the audio number checking means finds the audio number of the DTS audio to be greater than the audio number of the other audio, starts reproduction of the audio other than the DTS audio;

output setting checking means that, if the audio number checking means finds the audio number of the DTS audio to be smaller than the audio number of the other audio, checks whether, during setup, DTS digital output is set for digital output or turned off;

second reproduction starting means that, if the output setting checking means finds the DTS digital output to be set for digital output in a form of a bit stream, starts reproduction of the DTS audio assigned an audio number "1"; and third reproduction starting means that, if the output setting checking means finds the DTS digital output to be turned off, starts reproduction of audio, other than the DTS audio, assigned a smallest audio number among audio numbers "2" and greater.

2. An optical disc reproduction apparatus comprising:

optical disc reproducing means furnished with no capability of outputting DTS audio on an analog basis but a capability of outputting DTS audio on a digital basis, the optical disc reproducing means reproducing information recorded on an optical disc; and a controller that when DTS digital output is set for digital output during setup and in addition DTS audio is assigned an audio number "1", selects and starts to reproduce the DTS audio and when DTS digital output is turned off during setup, selects and starts to reproduce audio assigned a smallest audio number other than the DTS audio.

3. The optical disc reproduction apparatus of claim 2, wherein the controller includes:

audio number checking means that checks whether an audio number of DTS audio on an optical disc is greater or smaller than an audio number of other audio;

first reproduction starting means that, if the audio number checking means finds the audio number of the DTS audio to be greater than the audio number of the other audio, starts reproduction of the audio other than the DTS audio;

output setting checking means that, if the audio number checking means finds the audio number of the DTS audio to be smaller than the audio number of the other audio, checks whether, during setup, DTS digital output is set for digital output or turned off;

second reproduction starting means that, if the output setting checking means finds the DTS digital output to be set for digital output in a form of a bit stream, starts reproduction of the DTS audio assigned an audio number "1"; and third reproduction starting means that, if the output setting checking means finds the DTS digital output to be turned off, starts reproduction of audio, other than the DTS audio, assigned a smallest audio number among audio numbers "2" and greater.

4. An optical disc reproduction apparatus comprising:

an optical pickup that reads compressed data of video and audio recorded on an optical disc;

storing means that stores a table containing identification information for identifying type of the compressed data read by the optical pickup;

a demultiplexer that sorts the compressed data read by the optical pickup according to the type of the compressed data based on the identification information stored in the storing means;

video reproducing means that reproduces video data based on the compressed data of video sorted out by the demultiplexer;

audio reproducing means that reproduces audio data based on the compressed data of audio sorted out by the demultiplexer; and a controller that controls the optical pickup, the storing means, the video reproducing means, and the audio reproducing means, wherein the identification information stored in the storing means contains audio identification information for identifying type of the audio data, wherein the audio reproducing means has various audio decoders for reproducing compressed data of various types of audio read by the optical pickup, is configured to compare audio identification information contained in the compressed data of audio read by the optical pickup with the audio identification information stored in the table in order to identify type of the compressed data of audio read by the optical pickup and select, according to the identified type of the compressed data, a corresponding audio decoder from among the various audio decoders, and is furnished with no capability of outputting DTS audio on an analog basis but a capability of outputting DTS audio on a digital basis, wherein the controller, when DTS digital output is set for digital output during setup and in addition DTS audio is assigned an audio number "1", selects and starts to reproduce the DTS audio and when DTS digital output is turned off during setup, selects and starts to reproduce audio assigned a smallest audio number other than the DTS audio.

5. The optical disc reproduction apparatus of claim 4, wherein the controller includes:

audio number checking means that checks whether an audio number of DTS audio on an optical disc is greater or smaller than an audio number of other audio;

first reproduction starting means that, if the audio number checking means finds the audio number of the DTS audio to be greater than the audio number of the other audio, starts reproduction of the audio other than the DTS audio;

output setting checking means that, if the audio number checking means finds the audio number of the DTS audio to be smaller than the audio number of the other audio, checks whether, during setup, DTS digital output is set for digital output or turned off;

second reproduction starting means that, if the output setting checking means finds the DTS digital output to be set for digital output in a form of a bit stream, starts reproduction of the DTS audio assigned an audio number "1"; and third reproduction starting means that, if the output setting checking means finds the DTS digital output to be turned off, starts reproduction of audio, other than the DTS audio, assigned a smallest audio number among audio numbers "2" and greater.

* * * * *